United States Patent
Goldberg

(10) Patent No.: US 6,223,158 B1
(45) Date of Patent: Apr. 24, 2001

(54) STATISTICAL OPTION GENERATOR FOR ALPHA-NUMERIC PRE-DATABASE SPEECH RECOGNITION CORRECTION

(75) Inventor: Randy G. Goldberg, Princeton, NJ (US)

(73) Assignee: AT&T Corporation, Middletown, NJ (US)

( * ) Notice: Subject to any disclaimer, the term of this patent is extended or adjusted under 35 U.S.C. 154(b) by 0 days.

(21) Appl. No.: 09/018,449

(22) Filed: Feb. 4, 1998

(51) Int. Cl.[7] .................................................. G10L 15/14
(52) U.S. Cl. .......................................... 704/252; 704/254
(58) Field of Search .................................. 704/231, 251, 704/252, 254, 255, 256, 257, 275, 240

(56) References Cited

U.S. PATENT DOCUMENTS

| | | |
|---|---|---|
| 3,466,394 | 9/1969 | French . |
| 3,752,904 | 8/1973 | Waterbury . |
| 3,896,266 | 7/1975 | Waterbury . |
| 3,988,715 | 10/1976 | Mullan et al. . |
| 4,718,102 | 1/1988 | Crane et al. . |
| 4,817,156 | 3/1989 | Bahl et al. ............................. 704/256 |
| 4,908,865 | 3/1990 | Doddington et al. ................. 704/272 |
| 5,023,912 | 6/1991 | Segawa ................................... 381/43 |
| 5,027,406 | 6/1991 | Roberts et al. ......................... 381/43 |
| 5,034,989 | 7/1991 | Loh ....................................... 382/189 |
| 5,050,215 | 9/1991 | Nishimura ............................. 704/244 |
| 5,101,345 | 3/1992 | MacPhail ............................... 707/1 |
| 5,125,022 | 6/1992 | Hunt et al. ............................. 379/88 |
| 5,127,043 | 6/1992 | Hunt et al. ............................. 379/88 |
| 5,167,016 | 11/1992 | Bagley et al. ........................ 395/144 |
| 5,179,718 | 1/1993 | MacPhail ............................. 707/514 |
| 5,216,720 | 6/1993 | Naik et al. ............................ 704/272 |
| 5,274,560 | 12/1993 | LaRue .................................. 364/444 |
| 5,283,833 | 2/1994 | Church et al. ......................... 381/41 |
| 5,297,194 | 3/1994 | Hunt et al. ............................. 379/88 |
| 5,303,299 | 4/1994 | Hunt et al. ............................. 379/88 |
| 5,365,574 | 11/1994 | Hunt et al. ............................. 379/88 |
| 5,418,717 | 5/1995 | Su et al. ........................... 364/419.08 |
| 5,452,397 | 9/1995 | Ittycheriah et al. ................. 395/2.49 |
| 5,454,062 | 9/1995 | LaRue ................................. 395/2.63 |
| 5,465,290 | 11/1995 | Hampton et al. . |
| 5,497,319 | 3/1996 | Chong et al. .................... 364/419.02 |
| 5,499,288 | 3/1996 | Hunt et al. ............................. 379/88 |
| 5,502,774 | 3/1996 | Bellegarda et al. ................. 382/159 |

(List continued on next page.)

FOREIGN PATENT DOCUMENTS

| | | |
|---|---|---|
| 0 319 193 A2 | 6/1989 | (EP) . |
| WO 96 10795 | 4/1996 | (WO) . |
| 96 30142 | 11/1996 | (WO) . |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE, vol. 85, No. 9, Sep., 1997; pp. 1437–1462.

*Primary Examiner*—David R. Hudspeth
*Assistant Examiner*—Martin Lerner
(74) *Attorney, Agent, or Firm*—Kenyon & Kenyon

(57) ABSTRACT

A method and apparatus for recognizing an input identifier entered by a user. A caller enters a predetermined identifier through a voice input device. A signal representing the entered identifier is transmitted to a remote recognizer, which responds to the identifier signal by producing a recognized output intended to match the entered identifier. The present invention then generates a set of option identifiers, each option identifier having a possibility of matching the input identifier. The set of option identifiers is then reduced to a set of candidate identifiers by eliminating those option identifiers that are not found among a set of stored reference identifiers. The present invention selects a match for the input identifier from the set of candidate identifiers.

50 Claims, 8 Drawing Sheets

U.S. PATENT DOCUMENTS

| | | | |
|---|---|---|---|
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,535,120 | 7/1996 | Chong et al. | 364/419.03 |
| 5,577,164 | 11/1996 | Kaneko et al. . | |
| 5,613,109 | 3/1997 | Yamauchi et al. . | |
| 5,623,609 | 4/1997 | Kaye et al. | 704/1 |
| 5,640,490 | 6/1997 | Hansen et al. | 704/254 |
| 5,642,519 | 6/1997 | Martin . | |
| 5,655,058 | 8/1997 | Balasubramanian et al. | 704/236 |
| 5,675,647 | 10/1997 | Garneau et al. | 380/20 |
| 5,675,706 | 10/1997 | Lee et al. | 704/256 |
| 5,677,989 | 10/1997 | Rabin et al. . | |
| 5,677,990 * | 10/1997 | Junqua | 704/255 |
| 5,680,511 | 10/1997 | Baker et al. | 395/2.66 |
| 5,729,656 | 3/1998 | Nahamoo et al. | 704/254 |
| 5,745,555 | 4/1998 | Mark | 379/93.03 |
| 5,748,840 * | 5/1998 | LaRue | 704/254 |
| 5,754,695 | 5/1998 | Kuo et al. . | |
| 5,764,799 | 6/1998 | Hong et al. | 382/225 |
| 5,769,527 | 6/1998 | Taylor et al. | 362/85 |
| 5,781,882 | 7/1998 | Davis et al. | 704/221 |
| 5,794,042 | 8/1998 | Terada et al. . | |
| 5,797,123 | 8/1998 | Chou et al. . | |
| 5,799,269 | 8/1998 | Schabes et al. . | |
| 5,802,205 | 9/1998 | Emico et al. | 982/187 |
| 5,806,040 | 9/1998 | Vensko . | |
| 5,818,952 | 10/1998 | Takenouchi et al. . | |
| 5,829,000 | 10/1998 | Huang et al. | 704/252 |
| 5,832,063 | 11/1999 | Vysotsky et al. . | |
| 5,841,901 | 11/1998 | Arai et al. . | |
| 5,850,480 | 12/1998 | Scanlon . | |
| 5,870,492 | 2/1999 | Shimizu et al. . | |
| 5,875,108 | 2/1999 | Hoffberg et al. | 364/146 |
| 5,889,897 | 3/1999 | Medina | 382/309 |
| 5,903,864 * | 5/1999 | Gadbois et al. | 704/251 |
| 5,913,196 | 6/1999 | Talmor et al. . | |
| 5,937,985 | 8/1999 | Zadrozny et al. . | |
| 6,061,654 * | 5/2000 | Brown et al. | 704/275 |

* cited by examiner

FIG. 3

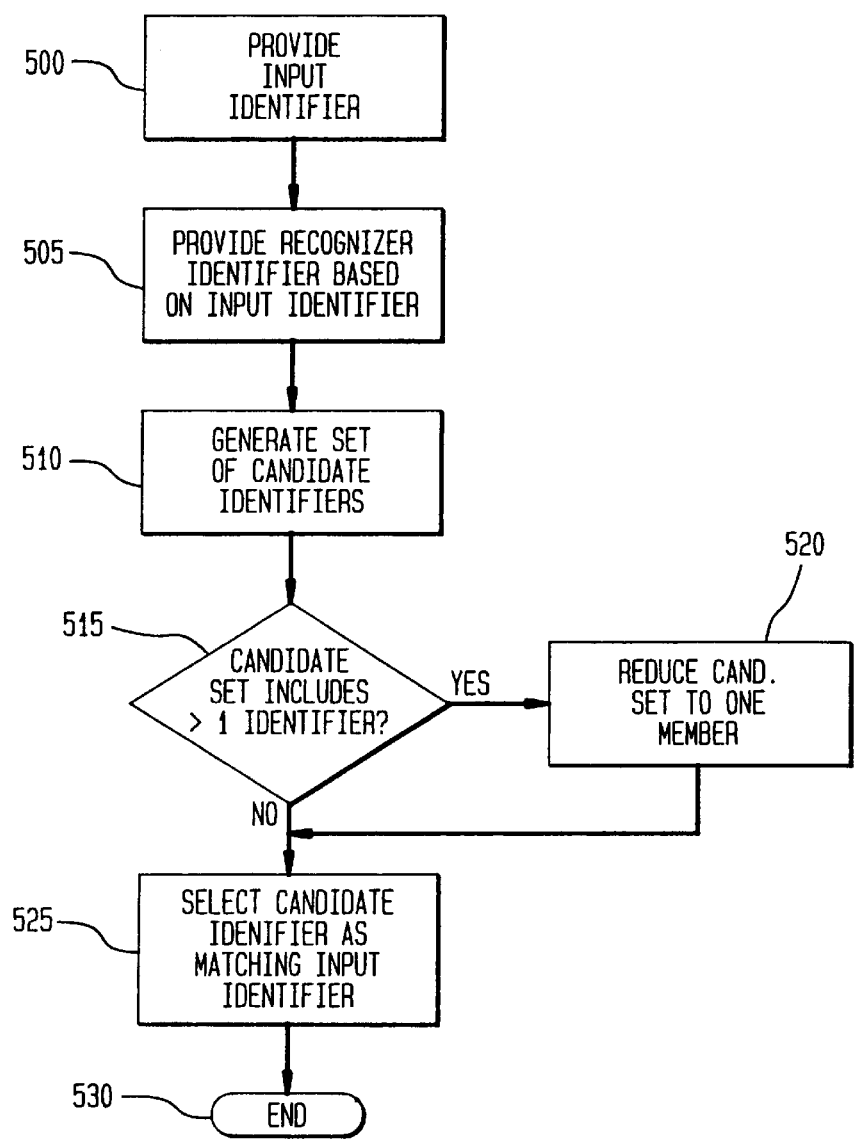

STATISTICAL OPTION GENERATOR FOR ALPHA-NUMERIC PRE-DATABASE SPEECH RECOGNITION CORRECTION

CROSS-REFERENCE TO RELATED APPLICATIONS

The present application is related to the following applications: U.S. patent application Ser. No. 08/763,382, filed Dec. 13, 1996, entitled "STATISTICAL DATABASE CORRECTION OF ALPHANUMERIC ACCOUNT NUMBERS FOR SPEECH RECOGNITION AND TOUCH-TONE RECOGNITION"; U.S. patent application Ser. No. 08/771,356, filed Dec. 16, 1996, entitled "CONSTRAINED ALPHA-NUMERICS FOR ACCURATE ACCOUNT NUMBER RECOGNITION"; U.S. patent application Ser. No. 08/909,199, filed Aug. 11, 1997, entitled "A CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE"; U.S. patent application Ser. No. 08/909,200, filed Aug. 11, 1997, entitled "METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM"; U.S. patent application Ser. No. 08/953,579, filed Oct. 17, 1997, entitled "METHOD AND APPARATUS FOR ACCESSING PRE-DEFINED GRAMMARS"; U.S. patent application Ser. No. 08/953,469, filed Oct. 17, 1997, entitled "METHOD AND APPARATUS FOR MINIMIZING GRAMMAR COMPLEXITY"; U.S. patent application Ser. No. 08/953,468, filed Oct. 17, 1997, entitled "METHOD AND APPARATUS FOR PERFORMING A GRAMMAR-PRUNING OPERATION"; U.S. patent application Ser. No. 08/975,587, filed Nov. 20, 1997, entitled "METHOD AND APPARATUS FOR PERFORMING A NAME ACQUISITION BASED ON SPEECH RECOGNITION"; U.S. patent application Ser. No. 08/975,588, filed Nov. 20, 1997, entitled "CONFUSION SET-BASED METHOD AND APPARATUS FOR PRUNING A PREDETERMINED ARRANGEMENT OF INDEXED IDENTIFIERS"; U.S. patent application Ser. No. 08/975,589, filed Nov. 20, 1997, entitled "CHECK-SUM BASED METHOD AND APPARATUS FOR PERFORMING SPEECH RECOGNITION"; U.S. patent application Ser. No. 08/982,678, filed Dec. 2, 1997, entitled "METHOD AND APPARATUS FOR ACCESSING A SYSTEM ON THE BASIS OF PLURAL MATCHING OPERATIONS"; and U.S. patent application Ser No. 09/018,575, entitled "A CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE," filed Feb. 5, 1998 and assigned to a common assignee.

BACKGROUND OF THE INVENTION

The present invention relates to a method and apparatus for recognizing an identifier that is entered into a system by a user, and in particular, to a method and apparatus that matches an input identifier to one of a plurality of reference identifiers by a process that includes generating a plurality of option identifiers.

Most institutions, such as banks and department stores, allow customers to access over the telephone a wide variety of services and account information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number or identifier. As used herein, the terms "account number" and "identifier" are used interchangeably, and they refer to a string of characters that may comprise a plurality of letters, numbers, or both. Furthermore, as used herein, an identifier may be used not only to identify a user, but also may be used as an identifier for identifying a particular product or service offered by an institution. In the first generation of automated customer-access systems, a user would enter such an identifier by sequentially pressing a series of keys provided on the telephone keypad. Each pressed key would correspond to a different character in the identifier. The pressing of these keys would produce a series of tones that would be provided over a telephone network to the institution. At the institution, the series of tones would be decoded to produce the entered identifier, and if the identifier entered by the user was determined to correspond to a valid identifier, then the user would be allowed to enter commands, again through the telephone keypad, that would provide access to whatever services would be offered by the institution.

The next generation of automated customer-access systems eliminates the use of telephone keypads to verify the identity of a valid user. Instead of entering an identifier through a telephone keypad, a user would be prompted to speak the identifier into the telephone handset. For example, the user may speak into the telephone the identifier "JB123E". The user's voice signal would be transmitted over the phone lines to the institution, which would employ a speech recognition system to produce a recognized identifier that is intended to correspond exactly to the identifier spoken by the user. This recognized identifier would then be compared to a plurality of reference identifiers maintained in memory, each reference identifier representing, for example, a valid account number. If the recognized identifier matched a reference identifier, then the recognized identifier would be treated as validly matching the input identifier; the system would then execute a transaction on the basis of the matched input identifier.

Nevertheless, such exact correspondence between an input identifier and a recognized identifier is quite difficult to attain, mostly due to the deterioration of voice signals that routinely occurs over conventional telephone lines. In particular, as a voice signal is transmitted to a remote location, conventional telephone lines introduce into such signals noise and restrictive band limitations. Such a deterioration present in a voice signal may cause a remote speech recognizer to produce a recognized output that does not correspond to the spoken identifier. Because of the limitations introduced into the voice signal by the telephone lines, the speech recognizer may confuse similar sounding letters and numbers. Thus, a speech recognizer may confuse the letter "A" with the number "8", the letter "K", or the letter "J". Similarly, the speech recognizer may confuse the letter "C" with the letter "D" or the number "3". For example, given that a user speaks the identifier "JB123E" into a telephone, the speech recognizer may produce "AE123D" as an output.

In order to improve the accuracy of such speech recognition systems, the invention of U.S. patent application Ser. No. 08/763,382 ("the '382 application") which is hereby incorporated by reference, performs a probabilistic determination that selects the reference identifier that most likely matches the input identifier. In order to perform this probabilistic determination, the system of the '382 application employs one or more confusion matrices, each confusion matrix being an arrangement of probability values that individually represent the probability that a particular input character will be recognized either as itself or as another character. For example, such a confusion matrix would store values representing the probability that an A spoken by a user would be recognized as either itself or as any other character, such as an 8, a J, a K, or a B. After producing a recognized identifier on the basis of the input identifier provided by the user, the system of the '382 application performs a character-by-character comparison between the recognized identifier and each reference identifier. In performing this comparison, the system of the '382 application uses the confusion matrix to determine the probability that, given a particular character of the recognized identifier, the character occupying the corresponding character position in the reference identifier under comparison would have been spoken by the user. This system then calculates an identifier recognition probability for each reference identifier on the basis of the confusion matrix values obtained during the comparison between each reference identifier and the recognized identifier. The reference identifier associated with the highest identifier recognition probability is then selected as the most likely match for the input identifier. For systems that store an exceedingly large number of reference identifiers, however, performing the above-described calculation for each reference identifier may involve undue delays and use an excessive amount of available processing resources. Accordingly, in systems that employ such a large amount of reference identifiers, a need exists to determine in a timely manner the most likely match for an input identifier without unduly expending available computing resources.

SUMMARY OF THE INVENTION

In order to improve the operability of such previously proposed systems, the present invention is directed to a method and apparatus that matches an input identifier to a valid reference identifier by first generating a plurality of option identifiers that have a possibility of matching the input identifier. The generated option identifiers are then reduced to a candidate set of reference identifiers by eliminating those option identifiers that are not found in the plurality of stored reference identifiers. The system of the present invention then selects a match for the input identifier from this candidate set of reference identifiers, which is substantially less in number than the total amount of stored reference identifiers. Thus, by avoiding calculating an identifier recognition probability for each reference identifier, the system of the present invention reduces the time for matching an input identifier and conserves the computing power available to the system.

According to a first embodiment of the present invention, the present invention finds a match for an input identifier by first providing a recognized identifier based on the input identifier. The present invention then generates a set of option identifiers, each option identifier comprising a different plurality of characters determined on the basis of the recognized identifier and on a plurality of confusion sets. Each confusion set, which is generated on the basis of a certain confusion matrix, groups together a different plurality of characters that have a certain probability of being confused with one another. The recognized identifier is deemed to be a member of the set of option identifiers. After generating the option identifiers, the present invention reduces the set of option identifiers to a set of candidate identifiers by eliminating those option identifiers that are not found among a plurality of stored reference identifiers. The present invention then selects one candidate identifier as matching the input identifier. In order to select this matching candidate identifier, the present invention prompts the user with each candidate identifier; when the user confirms a prompted candidate identifier as a match for the input identifier, that confirmed candidate identifier is selected as a match for the input identifier.

According to another embodiment, the present invention, after generating a set of option identifiers, determines an associative weighting for each option identifier. Each associative weighting is calculated on the basis of the recognized identifier and a plurality of character weightings, each character weighting associated with a corresponding one of a plurality of confusion sets. After reducing the set of option identifiers to a set of candidate identifiers in the same manner discussed above, the present invention selects the candidate identifier with the highest associative weighting as a match for the input identifier.

According to yet another embodiment of the present invention, the present invention dispenses with the use of confusion sets and instead uses a confusion matrix to determine the above-described associative weightings.

BRIEF DESCRIPTION OF THE DRAWINGS

Other features and advantages of the present invention will become apparent from the following detailed description, together with the drawings, in which:

FIG. 3 shows a connectivity matrix that is used to derive a plurality of confusion sets from a particular confusion matrix;

FIG. 4 shows an exemplary plurality of confusion sets;

FIG. 5 shows a flow diagram corresponding to a first embodiment of the present invention;

DETAILED DESCRIPTION

Figure 1:
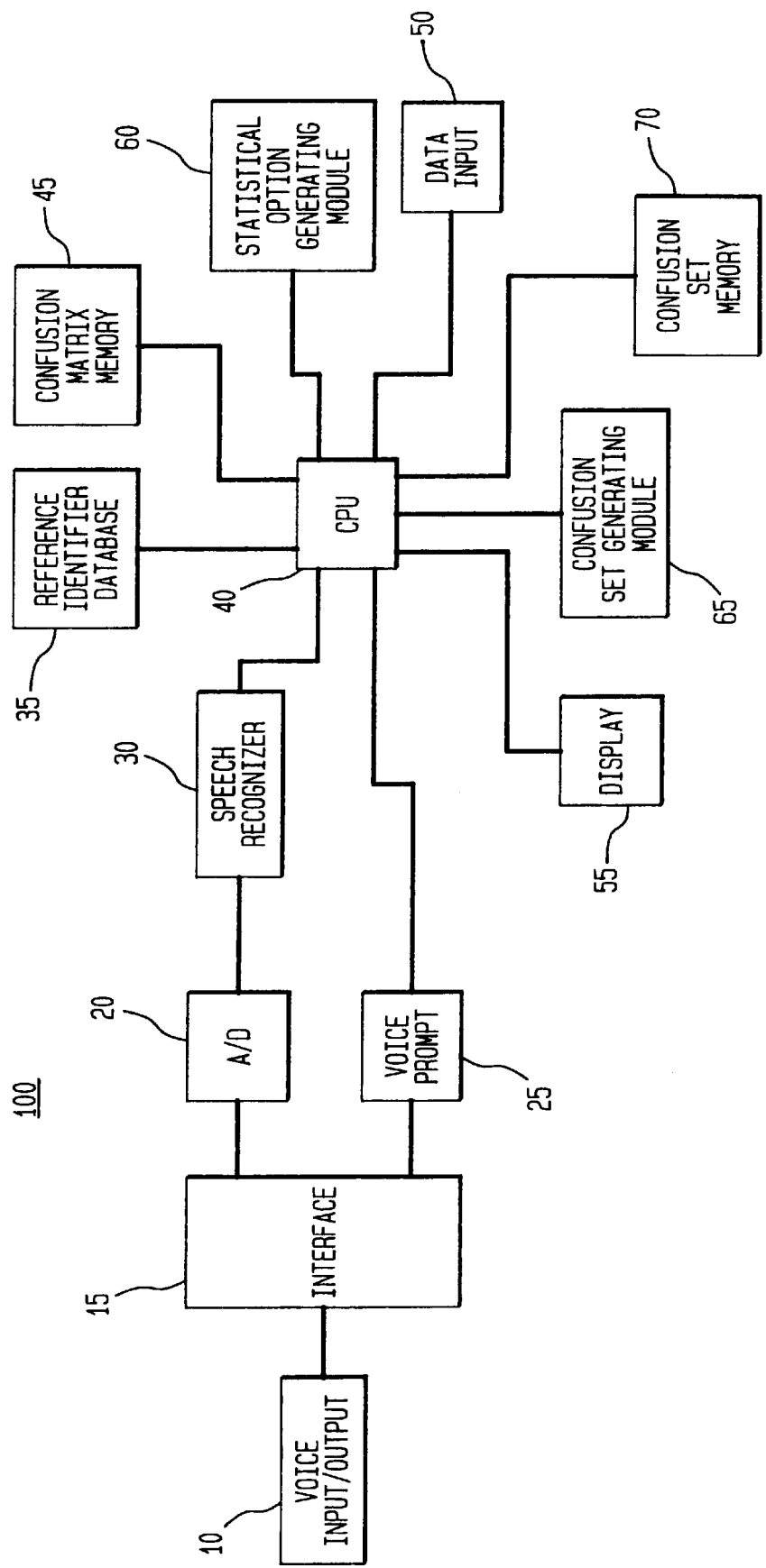
FIG. 1 shows a block diagram of a speech recognition system in accordance with the present invention.

FIG. 1 illustrates a system 100 in accordance with a first embodiment of the present invention. The system of FIG. 1 is merely an example of one kind of system that is capable of supporting the statistical option generator routine of the present invention, and it should be appreciated that the present statistical option generator routine is compatible with numerous other applications.

The system 100 of FIG. 1 includes a voice input/output device 10, which may comprise a conventional telephone, or any other known device capable of converting an audible vocal signal to an electrical signal and vice versa. Connected to the voice input/output device 10 is an interface 15 that interfaces the voice input/output device 10 to the remaining components of system 100. The interface 15 may comprise a conventional public switched telephone network ("PSTN"). Of course, an interface is necessary only if the voice is to be transmitted to a remote location for processing; as an alternative, the components of system 100 may be provided in a unitary apparatus, save for the interface 15. The present invention is intended to encompass both types of systems. After the voice signal is converted to a digital signal by an analog-to-digital ("A/D") converter 20, the digitized voice signal is provided to a speech recognizer 30, which may comprise a HARK® 3.0 recognizer, for example. The input voice signal is referred to as an "input identifier." After employing a suitable speech recognition routine, which may, for example, be based on the Hidden Markov Model, speech recognizer 30 provides a recognized output that is intended to correspond to the information that the user spoke into the voice input/output device 10. This recognized output, which is in the form of a well-known digital code, is referred to as a "recognized identifier," and it is provided to an input of central processing unit 40. Coupled to CPU 40 are a reference identifier database 35, a confusion matrix memory 45, a statistical option generating module 60, a confusion set generating module 65, and a confusion set memory 70. Also coupled to CPU 40 are data input device 50 and display 55. Data input device 50 may comprise a keyboard, a floppy disk drive, a CD-ROM drive, or any other component that is suitable for delivering external data to system 100. The system 100 also includes a voice prompt device 25, which provides, under the control of CPU 40, audible voice prompts that are intended to guide a user through the operation of system 100.

During operation, the system 100 accepts a particular spoken identifier from a user through voice input/output device 10. For example, the user may spell a particular identifier, which may be in the form of a name, word, account number, or any other combination of letters, numbers, or even such typographic symbols such as @, #, %, etc. The particular format of the identifier is referred to as a "grammar." For example, if the grammar for each identifier is in the form of (Letter, Letter, Number, Number, Number, Either), then each identifier would be required to begin with two letters as the initial two characters, followed by three numbers, and then completed by either a number or a letter. The identifiers AB123C and DN4568 would thus conform to this grammar. Of course, the present invention is not limited to this grammar, but is instead compatible with other grammars of various character lengths and composition. Thus, since identifiers may be formatted in accordance with various grammars, the term "identifier" may refer to any combination of letters, numbers, or typographic characters. In order to accommodate the vast range of possible grammars, system 100 must be programmed in advance to recognize identifiers provided according to a particular grammar for a particular application. Thus, if company X is to use the system 100 to allow customers to access information based on account numbers that are in the form of (Number, Number, Number, Letter), before the system 100 is put to use in real time, the system 100 would first be pre-programmed according to any suitable technique to process identifiers formatted in accordance with this account number grammar.

As explained above, the recognizer 30 accepts a digitized voice signal based on the spoken identifier and produces a recognized identifier that is intended to match the spoken identifier. Reference identifier database 35 contains a plurality of reference identifiers that comprise characters arranged in accordance with a particular grammar. The present discussion shall assume that the reference identifiers stored in reference identifier database 35 are valid account numbers formatted in accordance with a predetermined grammar (Letter, Letter, Number, Number, Either, Either). Since the amount of reference identifiers maintained in database 35 may be very large, attempting to verify the validity of the input identifier by analyzing how close, in terms of the above-described recognition probability, each reference identifier is to the recognized identifier may be time-consuming and consume too much processing power. Through the operation of the confusion set generating module 65 and the statistical option generating module 60, the search for a reference identifier that matches an input identifier is greatly simplified by using a pre-generated group of confusion sets to generate, without using the contents of database 35, the N most likely identifiers that would match the input identifier. The N best choices are then compared to the contents of reference identifier database 35. If one of these N best choices matches a reference identifier in database 35, then the matched reference identifier is selected as matching the input identifier. If more than one of the N best choices are matched with a corresponding reference identifier, the group of reference identifiers that matches the N best choices are identified as a candidate set of reference identifiers, and the reference identifier that matches the input identifier is selected from this candidate set according to any one of several techniques to be described later.

Although the principles of the present invention are discussed herein within the context of a speech recognition system, it should be appreciated that the present invention may also rely on touch-tone telephone signaling to produce the recognized identifier. In this type of system, a user would enter the characters of the identifier by manipulating an appropriate set of keys on a telephone handset. Speech recognizer 30 would be replaced by any suitable device, commonly available in current touch-tone recognition systems, that would produce a recognized identifier based on the entered touch-tone signals.

Figure 2:
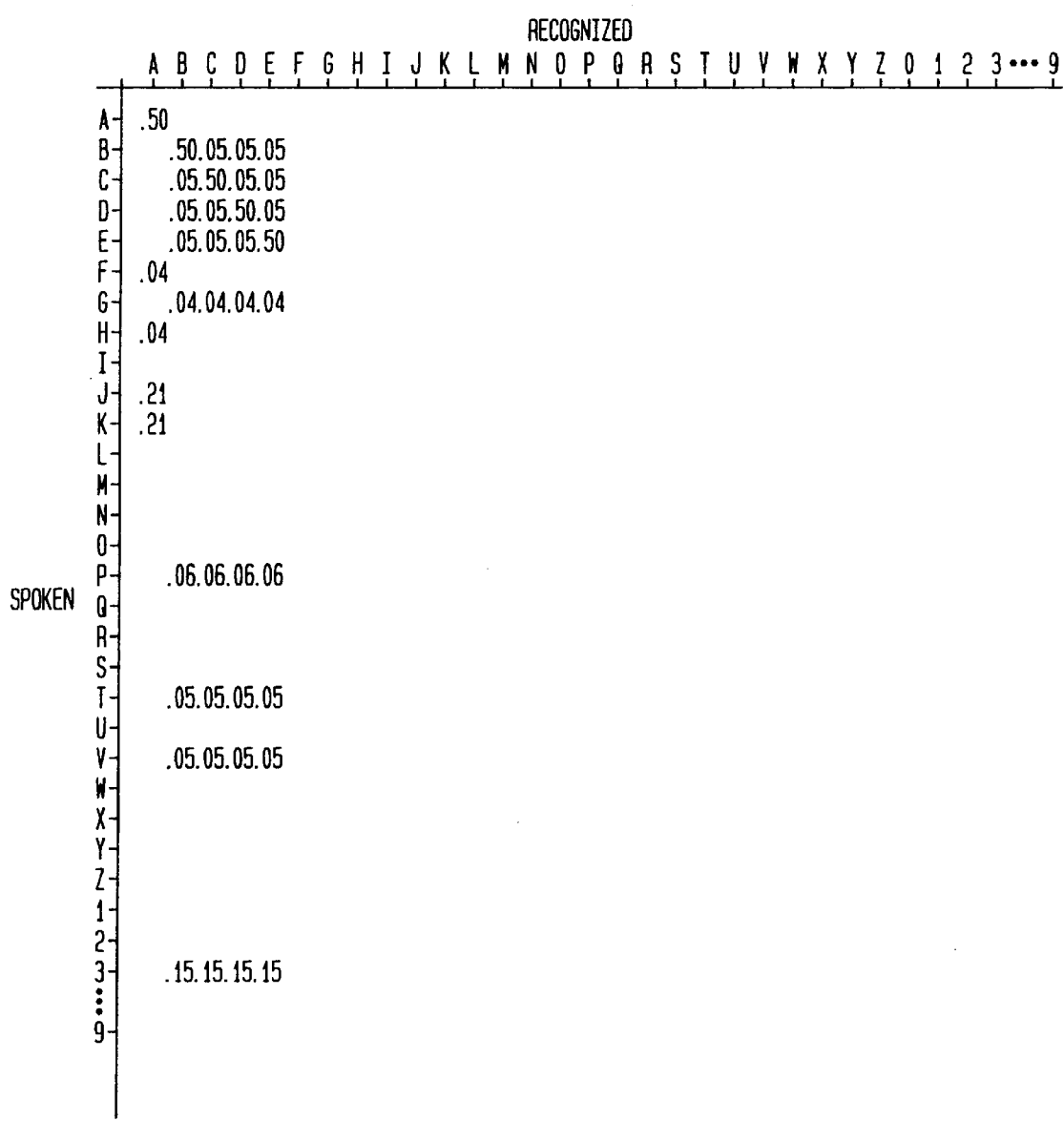
FIG. 2 shows a confusion matrix for arranging a plurality of probabilities indicative of the likelihood that a particular character in a reference identifier was spoken by a user.

Since the operation of statistical option generating module 60 depends on groupings of characters that are referred to as "confusion sets," the following discussion shall explain what these sets are and the criteria that are used in arranging the characters into these sets. U.S. patent application Ser. No. 08/975,588 ("the '588 application"), which is incorporated by reference herein, also contains a discussion for generating confusion sets. In order to understand the criteria by which confusion sets may be generated, it is necessary to first explain what a confusion matrix is, since confusion sets may be generated from one or more confusion matrices. The confusion matrix memory 45 stores a plurality of recognition probabilities arranged in matrix form. An example of a confusion matrix is illustrated in FIG. 2. In the example of FIG. 2, each recognition probability is provided in the form of a decimal value. Each recognition probability represents the probability that a particular character spoken by a user into voice input/output device 10 will be recognized by recognizer 30 either as the same character or as another character. For example, the confusion matrix is intended to provide a probability that, when "A" is spoken into device 10, the recognizer 30 will yield an "A", or a "B", a "C", etc., for that particular spoken character. Although in practice the confusion matrix stored in memory 45 would include entries for each intersection between each row and each column, for the sake of simplicity and ease of understanding, the confusion matrix of FIG. 2 includes a non-zero entry at only some of these row/column intersections. Thus, each blank entry in FIG. 2 is read as a zero; in practice, however, the entire matrix may be populated with recognition probabilities. Other possible confusion matrices may cover, in addition to letters, numbers, and other characters as well.

The confusion matrix of FIG. 2 is read as follows: the vertical columns correspond to characters that are produced by recognizer 30. The horizontal rows correspond to characters that are spoken by a user into voice input/output device 10. Of course, the confusion matrix of FIG. 2 may be configured in reverse, in which the horizontal rows correspond to characters produced by recognizer 30, and in which the vertical columns correspond to characters that are spoken by the user. The values that are provided in the confusion matrix represent different probabilities. For example, based on the confusion matrix of FIG. 2, given that the character "A" is produced by recognizer 30, the probability that "A" was spoken by the user is 50%. The column for the character "A" also reveals a probability of 4% that an "F" was spoken when an "A" is recognized, a probability of 4% that an "H" was spoken when an "A" was recognized, a probability of 21% that a "J" was spoken when an "A" is, and a probability of 21% that a "K" was spoken when an "A" was recognized. Characters that are pronounced similarly are more likely to be confused with each other, and the values that populate the confusion matrix of FIG. 2 reflect that observation. That is why, since "A" and "J" sound alike when pronounced, the recognition probability that a spoken "A" will be misrecognized by recognizer 30 as "J" (21%) is higher than the recognition probability that a spoken "A" will be misrecognized by recognizer 30 as an "F" (4%).

The particular probabilities that are provided in FIG. 2 are determined in advance through experimentation, and they are tailored to suit the particular recognizer 30 to be used. Thus, before a particular recognizer is to be used in the system of FIG. 1, a confusion matrix corresponding to that particular recognizer must first be populated. Thus, when a particular recognizer is to be used in the system of FIG. 1, a test group of persons repetitively provides pronunciations of each of the characters to be included in the confusion matrix, and the recognized output of recognizer 30 for each pronunciation is recorded. In order that the results of these tests incorporate the influence of the noise and bandwidth limitations that affect speech recognizers operating under real conditions, the vocal pronunciations of this test group of persons may be provided to the speech recognizer 30 over a telephone line. From these various "trial runs" of speech recognizer 30, the probabilities that characterize the recognition accuracy of the speech recognizer 30 are established, and these probabilities can be entered as a confusion matrix into memory 45 through data input device 50. Since different recognizers exhibit different recognition accuracies, if speech recognizer 30 is to be replaced with a different recognizer, a confusion matrix corresponding to the replacement recognizer may be entered into memory 45. Or, alternatively, memory 45 may store in advance a plurality of predetermined confusion matrices corresponding to different recognizers, so that when a replacement recognizer is implemented, the corresponding confusion matrix may be accessed by entering a command through input device 50. It should be noted that the probabilities of a confusion matrix need not be arranged in matrix form, but may be arranged as an array, or as any other data structure capable of associating a recognized and spoken character in terms of a probability.

Figure 3:
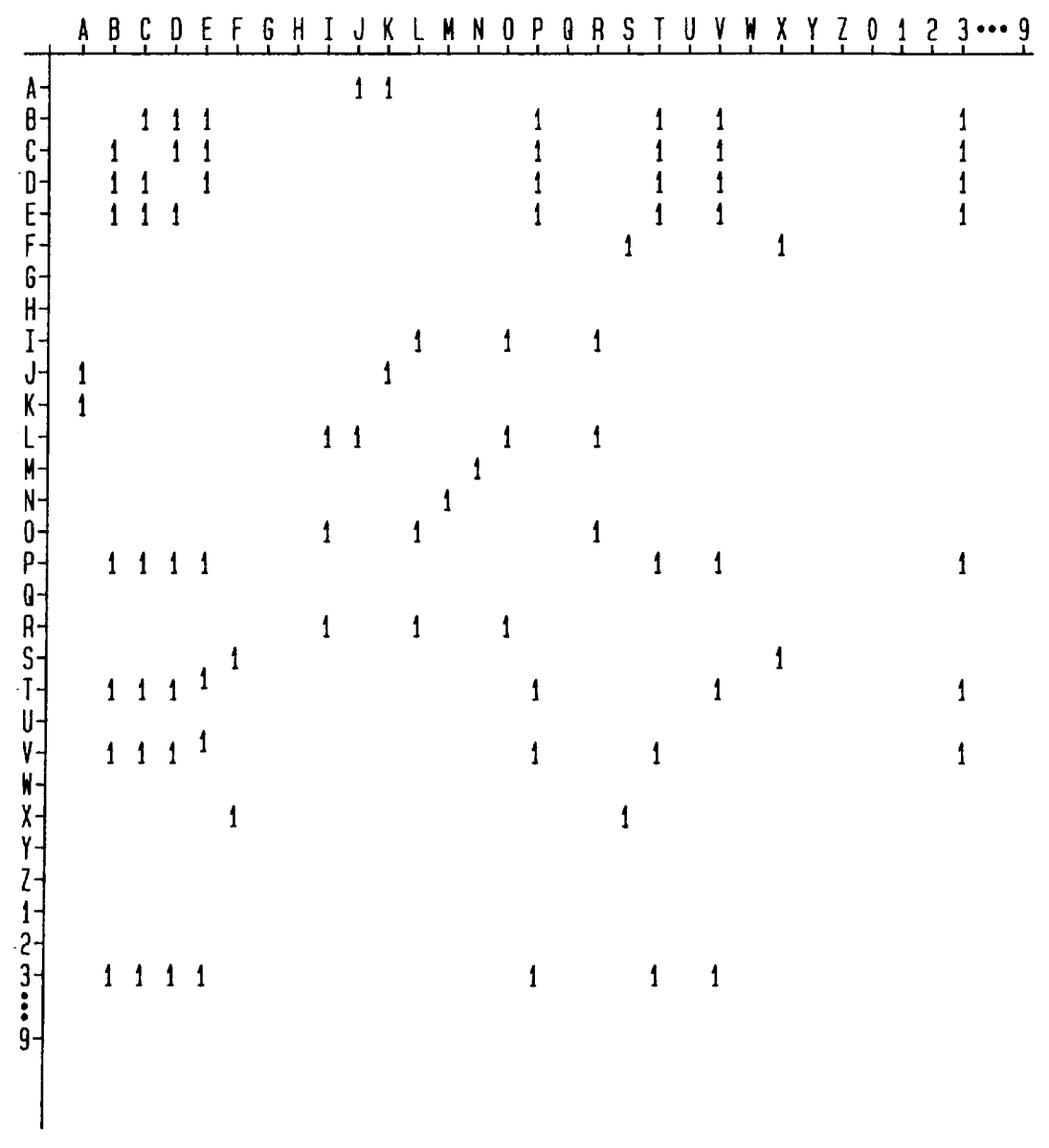

In order to discuss one manner in which a plurality of confusion sets are generated, reference is now made to FIGS. 3 and 4. FIG. 3 illustrates what is referred to as a connectivity matrix, from which a plurality of confusion sets may be obtained. An example of a plurality of confusion sets is shown in FIG. 4. For the sake of simplicity, these confusion sets do not include numerals, covering only letters instead. Each confusion set is intended to group together those characters that are most likely to be confused with each other. Within the context of a speech recognition system, the characters that are most often confused with each other are the characters that are pronounced the most similarly. The manner in which these confusion sets are generated is such that characters from different confusion sets have a relatively low probability of being confused with each other. As shall be explained in connection with FIG. 3, the determination of which characters should be grouped together may be based on the recognition probabilities arranged in the confusion matrix of memory 45. In FIG. 4, confusion set 1 groups together the characters "A", "J", and "K". Confusion set 2 groups together the characters "B", "C", "D", "E", "P", "T", and "V". Confusion set 3 comprises the characters "S", "F", and "X". Confusion set 4 comprises the characters "I", "R", "O", and "L". Confusion set 5 comprises the characters "M" and "N". Confusion set 6 comprises the character "W", and confusion set 7 comprises the character "H". For purposes of this discussion, the character content of each confusion set shall be referred to as a character collection. A character collection as used herein may include one or more characters.

Operating in accordance with the instructions provided by confusion set generating module 65 and in accordance with the confusion matrix provided in memory 45, CPU 40 performs the necessary calculations and procedures for generating the confusion sets, and once generated, these confusion sets are maintained in memory 70. The first step in generating the confusion sets involves generating a matrix based on the confusion matrix that corresponds to the speech recognizer 30 currently in use. In particular, each entry location (i.e., the intersection point of row X with column Y) of the newly generated matrix is populated with a value of 1 if the same entry location in the confusion matrix is populated with a recognition probability that is greater than a predetermined threshold. For those entry locations of the confusion matrix having recognition probabilities that are less than or equal to the threshold, the corresponding entry locations of the newly generated matrix receive a value of 0. The threshold is determined empirically according to any suitable method, and it reflects the recognition characteristics of the speech recognizer associated with the confusion matrix. The newly generated matrix that results from this procedure is a matrix that comprises only ones and zeroes. This matrix is then multiplied by itself a number of times equal to the amount of characters represented by the confusion matrix. Thus, if the confusion matrix covers only the alphabet, which includes twenty-six characters, then the ones-and-zeroes matrix is multiplied by itself twenty-six times. The product of this multiplication is referred to as a connectivity matrix, an example of which is illustrated in FIG. 3.

The distribution of characters among the various confusion sets depends on the distribution of ones in the connectivity matrix. Everywhere in the connectivity matrix that there is a "one," the characters of the associated row and column are included in the same confusion set. For example, in FIG. 3, the column corresponding to the character "A" includes a "one" at the rows corresponding to the characters "J" and "K". Thus, the characters "A", "J", and "K" are placed within one confusion set. For column "B", "ones" are associated with rows "C", "D", "E", "P", "T", and "V". Thus, the characters "B", "C", "D", "E", "P", "T", and "V" are included in another confusion set. This process is repeated until each character represented in the original confusion matrix is associated with a confusion set. The confusion sets of FIG. 4 represent one possible arrangement that the above-discussed process may yield.

It should be appreciated that this confusion set generation need not be performed after the system is put in practice, but instead may be accomplished before the system 100 begins interacting with users. Moreover, every time a new recognizer is installed, and consequently a new associated confusion matrix is activated, the system 100 requires a corresponding new plurality of confusion sets to be generated. Of course, each different plurality of confusion sets may be generated beforehand, so that if a new speech recognizer is implemented, the appropriate plurality of confusion sets may be activated by entering a command through data input device 50. Further, the above-discussed procedure is not the only way to generate a plurality of confusion sets; the present invention is intended to encompass any suitable process for grouping the most often confused characters with one another. Thus, for example, had the system 100 been programmed to store recognition probabilities according to a data structure other than a confusion matrix, the present invention would encompass whatever technique is suitable for that data structure for determining which groups of characters are most often confused with one another. Alternatively, the composition of each confusion set may be determined empirically by having a programmer or a group of persons select which characters should be grouped together based on how close they are perceived to be in view of their respective pronunciations.

For a more complete discussion of the operation of the system 100, reference is now made to the flow diagram of FIG. 5, which presents an algorithm, maintained in statistical option generating module 60, under which CPU 40 operates. The operation of system 100 begins when CPU 40 causes voice prompt device 25 to prompt a user to speak a particular input identifier into voice input/output device 10 (step 500). Assume, for example, that the user speaks the account number ABICJC into voice input/output device 10. The voice signal embodying this account number is digitized by A/D converter 20 and supplied to speech recognizer 30. In response to this digitized voice signal, speech recognizer 30 produces a recognized identifier intended to correspond to the information spoken by the user (step 505). Assume in this example that the recognizer 30 produces the recognized identifier ABICAC.

At this point, the previously proposed system described in the '382 application would determine in probabilistic terms how close each stored reference identifier is to the recognized identifier by calculating an identifier recognition probability for each reference identifier on the basis of the entries provided in one or more confusion matrices. The previously proposed system would then select the reference identifier associated with the highest identifier recognition probability as matching the input identifier. Nevertheless, if the number of reference identifiers is exceedingly large (on the order of 50,000, for example), then performing the probabilistic determination of the '382 application would require the consumption of an inordinate amount of processing resources. As a result, even though the system of the '382 application would be capable of eventually arriving at a match for the input identifier in the manner just described, not only would the expenses incurred in using such a system be prohibitive, but the delay in finding such a match would be unacceptable as well.

The present invention reduces the time for finding such a match by producing, without first consulting the list of stored reference identifiers, a series of possible matches for the input identifier. These possible matches are in the form of character strings, the composition of which depends on the particular recognized identifier that is currently under analysis and, in this embodiment, on the above-described confusion sets. These character strings are referred to as option identifiers, which are significantly less in number than the reference identifiers. Thus, by not calculating an identifier recognition probability for each reference identifier, the present invention avoids the computational burden that encumbers the previously proposed system within the context of applications requiring the analysis of an exceedingly large amount of valid reference identifiers.

On the basis of a further probabilistic determination, to be explained in connection with the flow diagrams of the present application, the present invention winnows the set of option identifiers down to a reduced set of candidate identifiers, from which a match for the input identifier is selected. Since both the set of option identifiers and the set of candidate identifiers most likely will contain a much smaller amount of identifiers than the amount of identifiers stored in reference identifier database 35, the present invention finds a match for the input identifier more quickly than the previously proposed system of the '382 application.

Returning to FIG. 5, after the system 100 produces a recognized identifier, CPU 40 generates a set of candidate identifiers (step 510). As shall be explained, in this embodiment these candidate identifiers are generated on the basis of the recognized identifier and the above-discussed confusion sets. As explained above, the process of generating a set of candidate identifiers requires first that a set of option identifiers be generated, after which the set of option identifiers are reduced in number according to predetermined criteria to create a smaller set of option identifiers, this set being referred to as a set of candidate identifiers. The process of generating the option identifiers is a process to determine which arrangement of characters, independent of the contents of reference identifier database 35, would most likely be confused with the recognized identifier. CPU 40 uses the confusion sets, which prior to the implementation of system 100 were generated by confusion set generating module 65 and stored in confusion set memory 70, to determine the character arrangement of the sundry option identifiers.

Thus, with respect to recognized identifier ABICAC, CPU 40, using any suitable algorithm, would go to the first character, A, and determine which confusion set it belongs to. The confusion sets of FIG. 4 indicate that the character A and the characters J and K are grouped together within one confusion set. Therefore, based on the information provided by the confusion sets, CPU 40 would generate option identifiers JBICAC and KBICAC. No other characters besides J and K would be used to replace the character A because, by definition, each confusion set groups together those characters that are most likely confused with one another. Therefore, given this particular arrangement of confusion sets, which may vary depending on the type of speech recognizer used, to replace the character A with characters that are outside its particular confusion set would be counterproductive because option identifiers resulting from such substitutions would have only a negligible chance of actually being confused by the speech recognizer 30 for the input identifier.

After replacing the character A with every other character in its corresponding confusion set, CPU 40 turns to the next character of the recognized identifier, B, and replaces this character with each character of the confusion set to which the character B belongs, each substitution creating another option identifier. Thus, given the confusion sets of FIG. 4, this operation would produce the following option identifiers: AEICAC, ACICAC, ADICAC, APICAC, ATICAC, AVICAC, JEICAC, JCICAC, JDICAC, JPICAC, JTICAC, JVICAC, KEICAC, KCICAC, KDICAC, KPICAC, KTICAC, and KVICAC.

This substitution is carried out for every character position of the recognized identifier. The generated character strings, as explained above, are referred to as option identifiers. By definition, the recognized identifier is also referred to as an option identifier since it too has a possibility of matching the input identifier. The next step is to compare the option identifiers with the reference identifiers in database 35 in order to eliminate those option identifiers that are not found in reference identifier database 35. Those option identifiers that remain are referred to as candidate identifiers. Most likely, the set of candidate identifiers will be much smaller than the set of reference identifiers. If the candidate set has only one member (step 515), then that candidate identifier is selected as matching the input identifier (step 525). In order to confirm that the selected candidate identifier does indeed correspond to what the user originally spoke into voice input/output device 10, CPU 40 may be programmed to cause voice prompt device 25 to prompt the user with the selected candidate identifier. If the user agrees that the selected candidate identifier corresponds to what he spoke into voice input/output device 10, he may press an appropriate key on the device 10 to communicate such a confirmation to the CPU 40; likewise, if the user discovers that what the system 100 has selected does not correspond to what he spoke, the pressing of another key can communicate such a rejection to the CPU 40. If the candidate set contains more than one identifier, then the candidate set would be reduced to one member (step 520). One way to accomplish this is to prompt the user with each of the candidate identifiers until the user confirms a match between the input identifier and a candidate identifier with which he has just been prompted. This confirmed candidate identifier is then selected as matching the input identifier (step 525). After the correct candidate identifier has been determined, then system 100 may proceed to execute a particular transaction on the basis of the matched identifier. For example, if the input identifier corresponded to a bank account number, system 100 would perform such typical transactions as retrieving account balance information or withdrawing cash on the basis of the input identifier.

Figure 6:
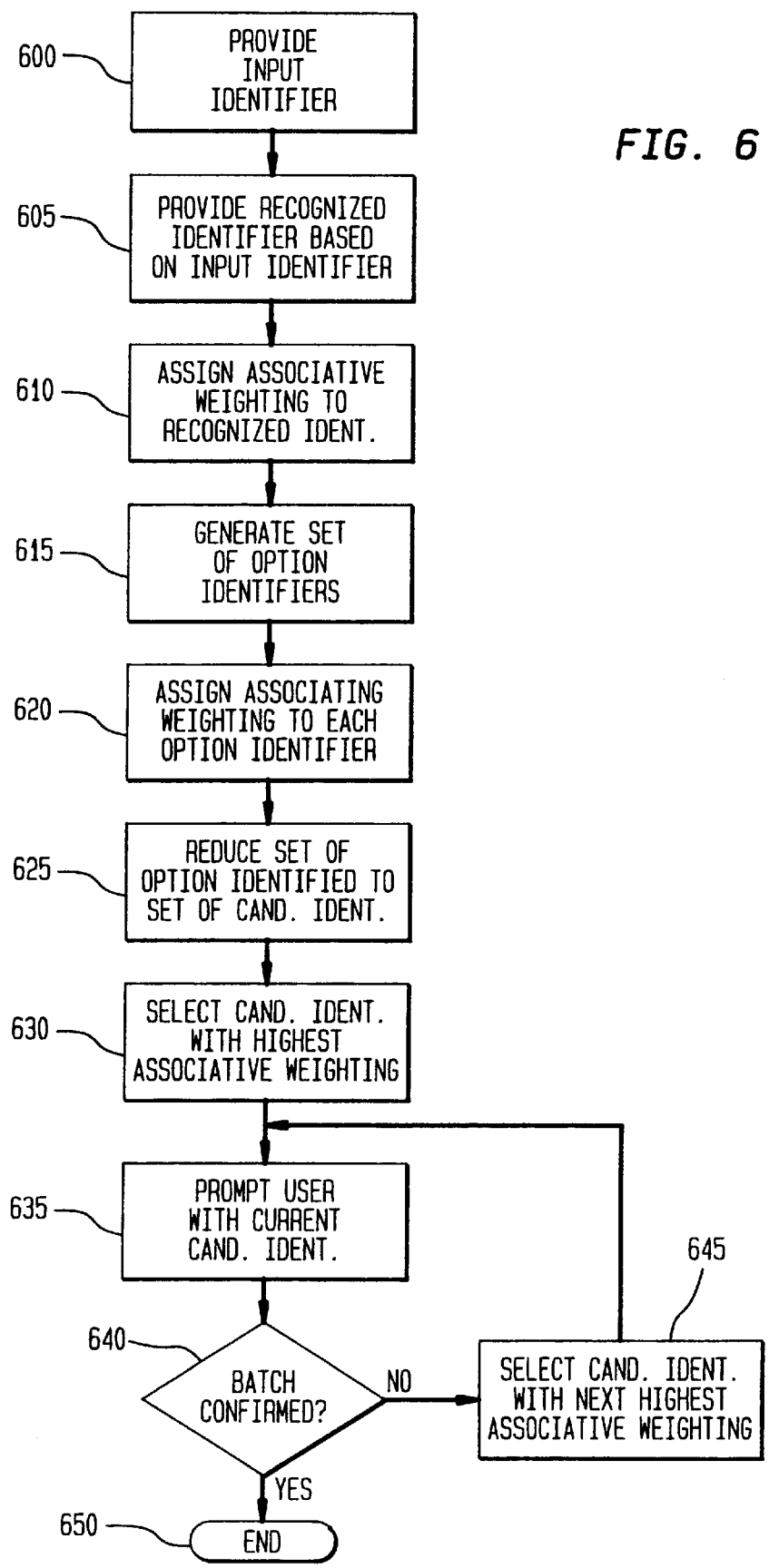
FIG. 6 shows a flow diagram corresponding to a second embodiment of the present invention.

In order to enhance the efficiency of the above-described procedure, FIG. 6 illustrates an algorithm, also maintainable in statistical option generating module 60, by which CPU 40, in finding a reference identifier that matches the input identifier, may provide an associative weighting to each generated option identifier. By using associative weightings, the present invention can rank the option identifiers according to their respective associative weightings. As a consequence, the present invention can discard any option identifier associated with weightings that are less than a predetermined threshold, or the present invention can select the top N option identifiers according to their associative weightings. The use of associative weightings in this manner enhances the efficiency and flexibility of the present invention.

The process of generating associative weightings begins, as with FIG. 5, by requiring the user to provide an input identifier (step 600) and producing a recognized identifier on the basis of the input identifier (step 605). CPU 40 then assigns an associative weighting to the recognized identifier (step 610). Each associative weighting is an expression of the relative likelihood that the particular identifier to which the weighting has been assigned matches the input identifier. In the case of the recognized identifier, each character of the recognized identifier may be assigned a weighting of 1; these individual weightings may be referred to as character identity weightings. These character weightings are multiplied to one another to yield an associative weighting of 1. Of course, multiplication is not the only valid mathematical procedure for yielding an associative weighting; depending on the application, the weightings assigned to each character of an option identifier may be added together or applied to some predetermined mathematical formula in order to yield an associative weighting for an identifier that is appropriate for a particular application.

Instead of using the value of 1 as a weighting factor, each character of the recognized identifier may be assigned a weighting that depends on the particular confusion matrix in use. Such a weighting would be referred to as a character identity weighting as well. According to this alternative, obtaining an associative weighting for the recognized identifier requires going to the confusion matrix from which the confusion sets were derived and obtaining an average of the entries that represent the probabilities that each character will be recognized as itself and not as some different character. In the confusion matrix of FIG. 2, these entries fall along the diagonal extending from the top left-hand corner to the bottom right-hand corner of the matrix. This diagonal represents the probability, for example, that an A will be recognized as an A, a B will be recognized as a B, etc. Once this diagonal average is calculated, each character of the recognized identifier is assigned this value as a character weighting, and the character weightings of each recognized identifier character are multiplied together to yield a particular associative weighting. The use of this "diagonal average" is more accurate in finding a match for the input identifier than using 1's. This "diagonal average" character identity weighting may also be referred to as a global character identity weighting.

After determining an associative weighting for the recognized identifier, according to either of the two methods just described, CPU 40 generates a set of option identifiers in the same manner as described in connection with FIG. 5 (step 615). Note that even though the recognized identifier was not generated in step 615, it too is considered an option identifier because it also has a possibility of matching the input identifier.

After generating the option identifiers, CPU 40 determines an associative weighting for each one (step 620). As explained above, the associative weighting for each option identifier is a function of the character weightings that have been assigned to each of the characters constituting the option identifiers. For these generated option identifiers, that is, those option identifiers excluding the recognized identifier, two types of character weightings are used to determine associative weightings for these option identifiers. One type of character weighting is referred to as character change weightings, and the other type is the same as the global character identity weighting just described. Thus, in order to generate an associative weighting for a particular option identifier, either a character change weighting or a character identity weighting must be assigned to each character of each generated option identifier.

Each confusion set is assigned a different character change weighting. Each confusion set may also be assigned the overall, global character identity weighting just described or, instead, a separate and different character identity weighting. The character change weighting assigned to each confusion set is an average of each of the confusion matrix values that reflect the respective probabilities that one character of the confusion set would be misrecognized as another character of the confusion set. For example, with respect to confusion set 1, which includes the characters A, J, and K, CPU 40 would obtain from the confusion matrix maintained in memory 45 the probability that an A would be misrecognized by the speech recognizer 30 as J, the probability that an A would be misrecognized as a K, the probability that a K would be recognized as an J, etc., until the probabilities of recognizing any character as any other character within the same confusion set have been obtained from the confusion matrix. Once all these recognition probabilities are obtained from the confusion matrix, CPU 40 averages them and assigns this averaged value to confusion set 1. This value is the character change weighting for confusion set 1; the same process is repeated in order to generate character change weightings for each one of confusion sets 2–7. In the confusion sets of FIG. 4, assume that confusion set 1 is assigned a character change weighting of 0.70, confusion set 2 is assigned a character change weighting of 0.60, confusion set 3 is assigned a character change weighting of 0.40, confusion set 4 is assigned a character change weighting of 0.75, confusion set 5 is assigned a character change weighting of 0.45, confusion set 6 is assigned a character change weighting of 0.96, and confusion set 7 is assigned a character change weighting of 0.92.

Each confusion set is also assigned a character identity weighting, which may comprise the just described global character identity weighting. Assume that this weighting has a value of 0.96. Alternatively, each confusion set may be assigned a different character identity weighting, one which reflects only the particular characters of the associated confusion set. According to this alternative, a character identity weighting is an average of the confusion matrix probabilities that each particular character to which this weighting corresponds will be correctly recognized as itself. For instance, in confusion set 1, this character identity weighting would be the average of the probability that an A would be recognized as an A, the probability that a J would be recognized as a J, and the probability that a K would be recognized as a K. These probabilities are obtained from the confusion matrix that is associated with the speech recognizer to be used. This calculation is carried out for each of the confusion sets, so that each confusion set is associated not only with a character change weighting, but also with a character identity weighting. Assume that in this example, confusion set 1 is associated with a character identity weighting of 0.91, confusion set 2 is assigned a character identity weighting of 0.95, confusion set 3 is assigned a character identity weighting of 0.93, confusion set 4 is assigned a character identity weighting of 0.95, confusion set 5 is assigned a character identity weighting of 0.94, confusion set 6 is assigned a character identity weighting of 0.96, and confusion set 7 is assigned a character identity weighting of 0.92. The character identity weightings and associated character change weightings for confusion sets 6 and 7 are the same because each of these confusion sets includes only one character.

Returning to FIG. 6, assume that the input identifier is AEJFD, the recognized identifier is JBKFP, and that the generated option identifiers are KBAXV, ATASE, AEJFD, and AEAST. In this example, CPU 40 would go to the first option identifier, KPAXV, and compare it to the recognized identifier JBKFP. CPU 40 then compares the first characters in these identifiers, namely J and K, to determine whether they are different or the same characters. If these characters are different, as they are here, CPU 40 determines whether they are from the same confusion set; if they are not from the same confusion set, the current option identifier is eliminated from consideration. If the characters are different from each other but are nevertheless from the same confusion set, as is the case with J and K, CPU 40 assigns to character K of the option identifier the character change weighting associated with K's confusion set, which is confusion set 1. This character change weighting, as mentioned above, is 0.70. Going to the next characters in the recognized identifier and the option identifier, B and B, CPU 40 determines in step 670 that they are the same character; consequently, CPU 40 assigns to character B of the option identifier the character identity weighting for confusion set 2, which is 0.95. If each confusion set was instead associated with a common, global character identity weighting, CPU 40 would assign the weighting of 0.96 to character B. After repeating this process for each character of option identifier KBAXV, the following character weightings are determined:

K: 0.70
B: 0.96
A: 0.70
X: 0.40
V: 0.60

In order to determine an associative weighting for this option identifier, these character weightings are multiplied together. Based on this multiplication, the associative weighting for option identifier KBAXV is 0.113. This process is repeated for the remaining option identifiers, so that the following associative weightings are produced:

ATASE: 0.115
AEJFD: 0.164
AEAST: 0.115

After assigning an associative weighting to each option identifier in the manner described above, CPU 40 further reduces the set of option identifiers by eliminating those identifiers that are not found in reference identifier database 35 (step 625). From this reduced set of option identifiers, CPU 40 selects an option identifier that matches the input identifier. CPU 40 accomplishes this by selecting the option identifier associated with the highest associative weighting (step 630); in this case, that option identifier is AEJFD, assuming that it would have been found in reference identifier database 35. The user may be prompted with this selected option identifier (step 635), and if the user positively confirms the selected option identifier, the procedure ends (step 650). If the user rejects the current option identifier (step 640), CPU 40 prompts the user with the option identifier corresponding to the next highest associative weighting (step 645). CPU 40 continues prompting the user with the option identifiers in this manner until either the user provides a positive confirmation or no more option identifiers remain for prompting. As an alternative, before beginning the prompting operation, CPU 40 may first select the option identifiers with the N highest associative weightings, or CPU 40 may select those option identifiers associated with associative weightings that exceed an empirically determined threshold. The user may then be prompted with each of the option identifiers selected in this fashion until the user provides a positive confirmation. An efficient way to prompt the user with these option identifiers would be to first rank them in descending order according to their associative weightings, and then start the prompting procedure with the highest ranked option identifier. The predetermined threshold used to eliminate certain option identifiers may be determined in accordance with the performance characteristics and accuracy of system 100.

If the user has been prompted with each candidate identifier without having confirmed a match with the input identifier, the CPU 40 may issue through voice prompt device 25 an error message, which may ask the user to speak the input identifier once more into voice input/output device 10 in order to repeat the matching process with a new speaker utterance. As with the algorithm of FIG. 5, if the user confirms that a candidate identifier matches the input identifier, system 100 may then execute a particular transaction in accordance with the matched reference identifier.

Figure 7:
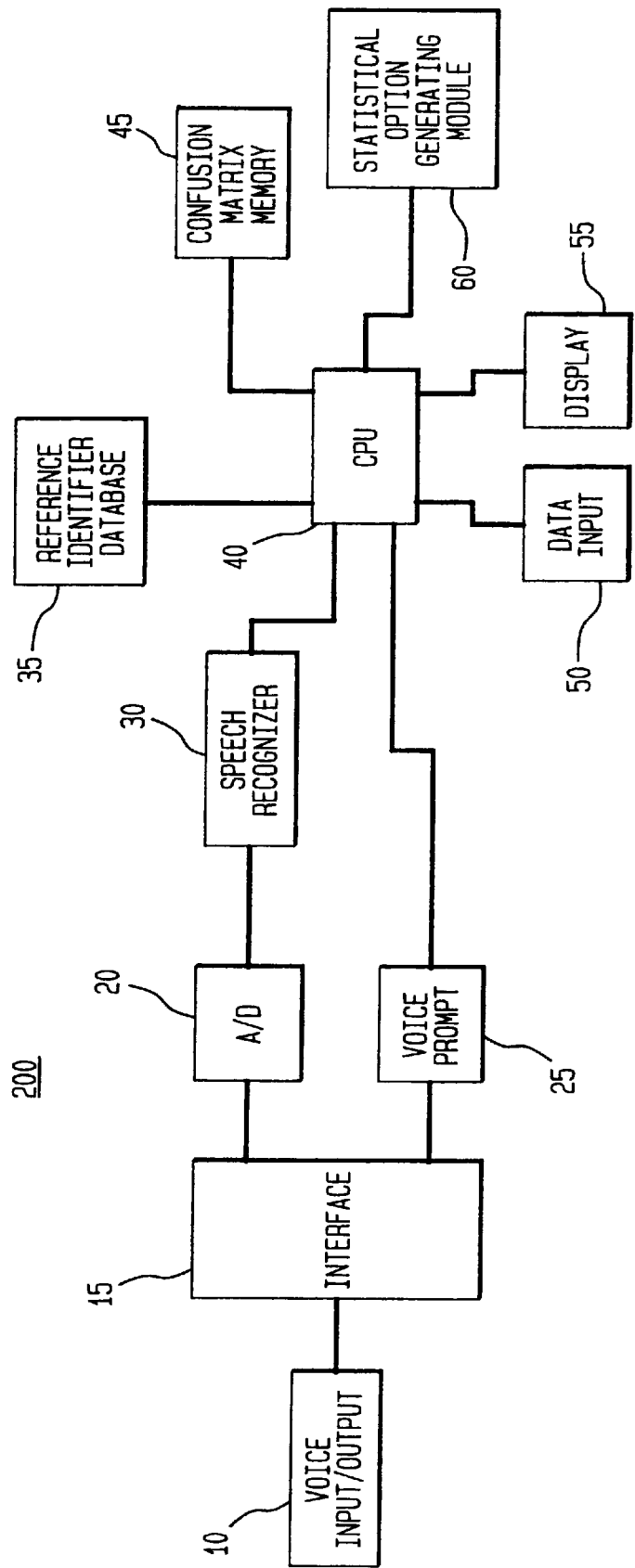
FIG. 7 shows a block diagram of a speech recognition system in accordance with a third embodiment of the present invention.
Figure 8A:
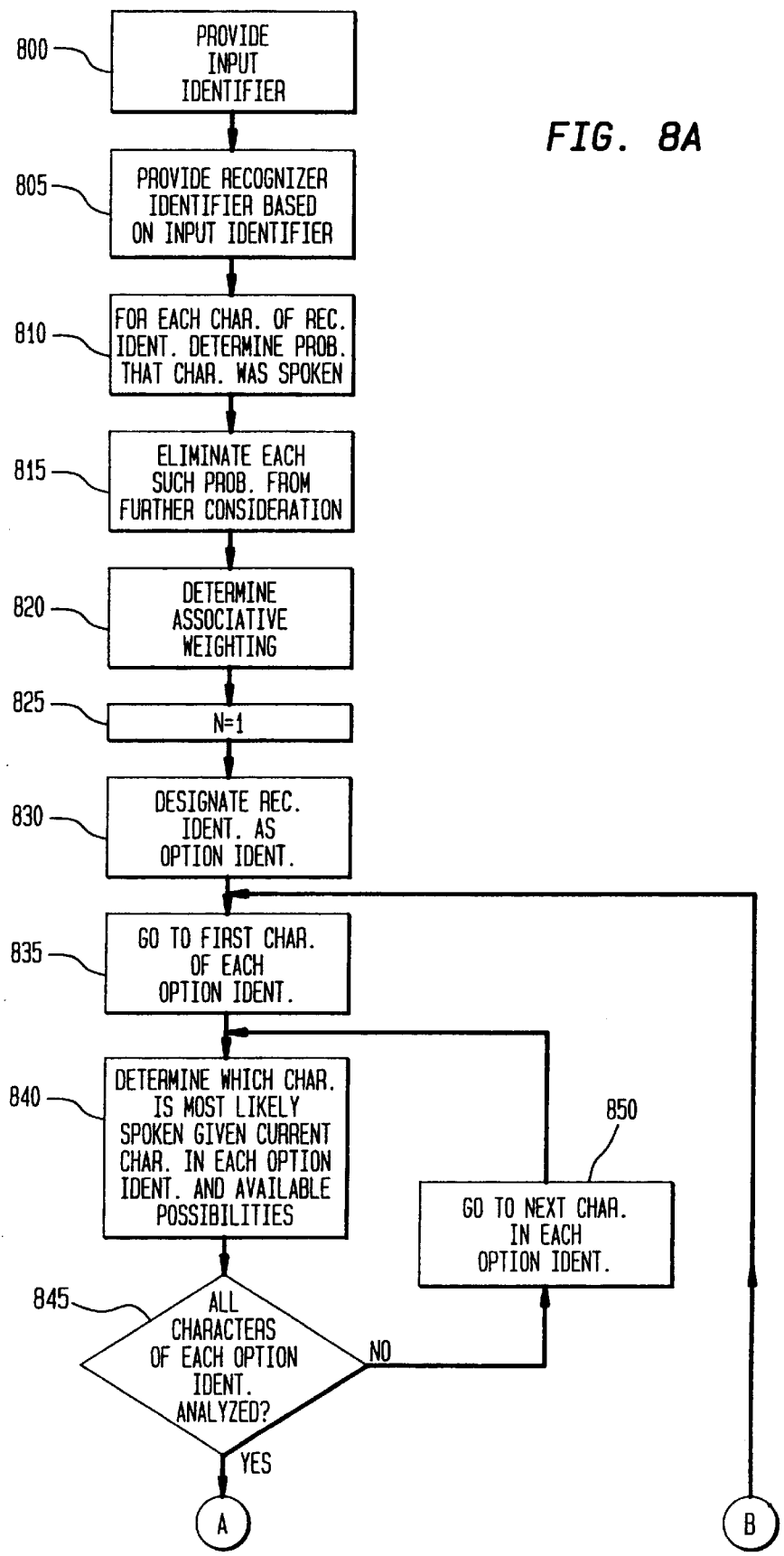
FIGS. 8(*a*) and 8(*b*) show a flow diagram corresponding to the operation of the system of FIG. 7.
Figure 8B:
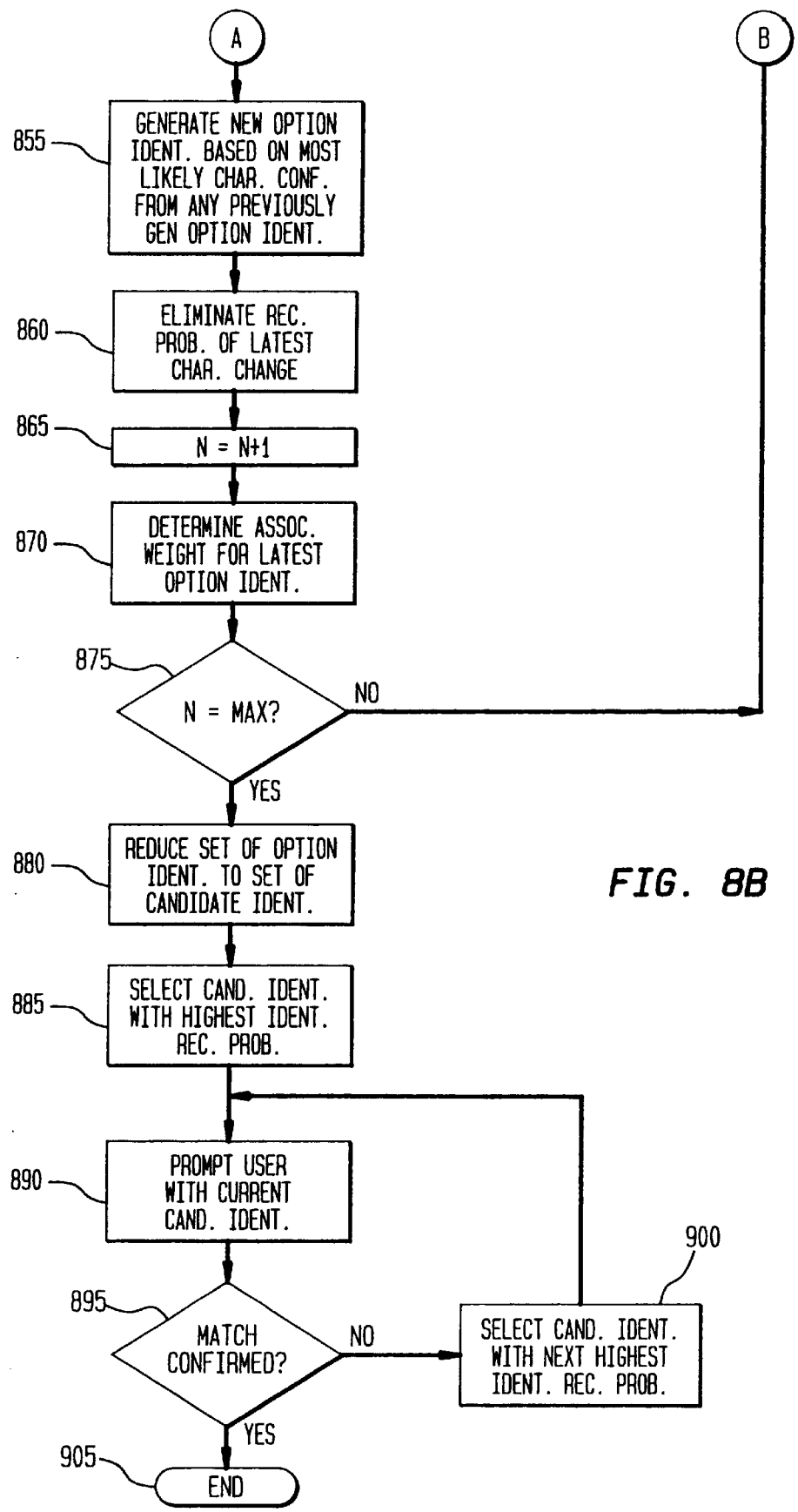

FIG. 7 illustrates another embodiment in accordance with the present invention. Unlike the previously discussed embodiment of FIG. 1, the embodiment of FIG. 7 does not use confusion sets, relying instead on the confusion matrix stored in memory 35 as the sole basis for the statistical option generation carried out by CPU 40. Hence, the embodiment of FIG. 7 omits the confusion set generating module 65 and the confusion set memory 70 of FIG. 1. In order to understand the operation of the embodiment of FIG. 7, FIGS. 8(*a*) and 8(*b*) illustrate an algorithm, also maintainable in statistical option generating module 60, by which CPU 40 may match an input identifier to a reference identifier maintained in database 35. After requiring a user to speak an input identifier and generating a recognized identifier based on the input identifier (steps 800, 805), CPU 40 obtains from the confusion matrix stored in memory 45 the probability that each character of the recognized identifier is recognized as itself (step 810). For example, if the recognized identifier is ABX, CPU 40 determines from the confusion matrix the probability that an A will be recognized by recognizer 30 as an A, the probability that a B will be recognized as a B, and the probability that an X will be recognized as an X. In this discussion, the probabilities used for this operation shall be assumed to come from a confusion matrix different than the one illustrated in FIG. 2. Thus, assume that the probability of recognizing an A as an A is 0.70, the probability of recognizing a B as a B is 0.60, and the probability of recognizing an X as an X is 0.65.

Each of these particular probabilities is then eliminated from further consideration, as if they each were crossed out in the confusion matrix from which they were derived (step 815). One way to "cross out" such confusion matrix entries is to associate in memory 45 each confusion matrix entry with a particular data field, the value of which indicates whether the associated entry is still under consideration. For example, a value of one in such a data field indicates that the associated confusion matrix entry is still under consideration, while a value of zero indicates that the associated confusion matrix entry has been used already and is thus eliminated from further consideration.

CPU 40 multiplies the probabilities obtained from the confusion matrix to produce an associative weighting. Note that in this embodiment, the associative weightings are not determined on the basis of character weightings; instead, they are derived directly from the confusion matrix. With respect to the recognized identifier, CPU 40 calculates an associative weighting as (0.70)(0.60)(0.65)=0.273 (step 820). Next, a variable N is set to one (step 825); this variable N corresponds to the number of option identifiers that are to be generated by the algorithm of FIGS. 8(*a*) and 8(*b*). Once the variable N is incremented to a value of MAX, the generation of option identifiers ceases. The value MAX is determined empirically with respect to the accuracy of recognizer 30 and the overall performance characteristics of system 200. With respect to the recognized identifier, which at this point is associated with an associative weighting, it is designated as an option identifier (step 830) that is to be grouped together with the option identifiers that are generated during the execution of steps 835–875.

The procedure outlined in steps 835–875 is used by CPU 40 to generate a plurality of additional option identifiers based on the characters of the recognized identifier (now dubbed as an option identifier itself) and on the confusion matrix currently in use. CPU 40 goes to the first character of each option identifier that has been generated so far (step 835). At this point, only one, the recognized identifier, has been generated; therefore, in this example, CPU 40 initially goes to character A. Turning to the confusion matrix, CPU 40 then determines which character confusion is most likely, given the current characters of the option identifiers that are under scrutiny (step 840). For example, since ABX is the only option identifier so far, CPU 40 would determine from the confusion matrix the character most likely confused by recognizer 30 for the character A. CPU 40 accomplishes this by determining which character, other than A, which was eliminated as a possibility in step 815, has the highest probability in the confusion matrix as being mistakenly recognized in place of A. Assume that this character is J and the probability, as stored in the confusion matrix, of the recognizer 30 confusing A and J with each other is 0.30. Since all the characters of the recognized identifier have not been analyzed (step 845), CPU 40 goes to the next character, B (step 850), and determines the character most likely confused with B. Assume that in this instance, the confusion matrix reveals that the possibility of confusing B and D with each other is 0.35 (step 840) and that D is the character most likely to be confused with B, simply because no other character in the confusion matrix (other than B itself, which was eliminated in step 815) is associated with a recognition probability higher than 0.35. Since B is not the last character of the recognized identifier (step 845), CPU 40 once again goes to the next character (step 850), which is X, and determines which character is most likely to be confused for X. Assume that the confusion matrix indicates that S is that character and that the probability of confusing X with S is 0.25.

Since X was the last character, CPU 40 then determines which of the likeliest confusions determined for each character is associated with the highest probability in the confusion matrix (step 855). In this example, three separate confusions and their respective probabilities have been determined: namely, the probability of 0.30 that an A will be misrecognized by recognizer 30 as a J, the probability of 0.35 that a B will be misrecognized as a D, and the probability of 0.25 that an X will be misrecognized as an S. Of these three possible misrecognitions, the one between B and D is associated with the highest probability. Therefore, CPU 40 selects this most likely of misrecognitions to produce the option identifier ADX (step 855). Furthermore, the probability of confusing D with B is eliminated from further consideration in the manner discussed above in connection with step 815 (step 860). After incrementing N by one (step 865), CPU 40 calculates an associative weighting for the latest option identifier (step 870). Framed as the probability that the identifier ABX would be recognized as ADX, the calculation for the associative weighting of the latest option identifier yields the value of 0.70 (the probability that an A would be recognized as an A) multiplied by 0.35 (the probability that a B would be recognized as a D) multiplied by a 0.65 (the probability that an X would be recognized as an X). Based on these probability values, the associative weighting for the option identifier ADX would be 0.159.

At this point, CPU 40 has generated two option identifiers. Assuming that N has not yet been incremented to MAX (step 875), CPU 40 would then proceed to determine a new option identifier, using the previous two as roots for the calculations necessary for this latest iteration of steps 835–875. Thus, CPU 40 would go to the first characters of option identifiers ABX and ADX (step 835) and determine from the confusion matrix which is the most likely character to be misrecognized for A (step 840). As with the previous example, assume that the character is J and the probability of misrecognition is 0.30. Going to the next respective characters in each of the option identifiers, B and D (steps 845, 850), CPU 40 would determine the character(s) most likely confused with each of these characters. Since the previous iteration of this process eliminated from consideration the possibility of misrecognizing a D for a B, in analyzing the character B, CPU 40 will be prohibited from considering this possibility when examining the contents of confusion matrix memory 45. Assume that the next most likely character that can be misrecognized by recognizer 30 for a B is the number 3, and that according to the confusion matrix the probability of this happening is 0.33. With respect to the character D, assume that the character most likely confused with D is P, with a probability of 0.34 that such a misrecognition can happen. The next and final character to be considered is X, and again, as explained in the previous iteration, the most likely character that is confused with X is S, with a probability of 0.25. After obtaining these various probabilities, CPU 40 determines the most likely character confusion based on the obtained recognition probabilities; in this iteration, the character confusion of D to P is the most likely character confusion. Thus, the next option identifier to be generated is APX (step 855). Moreover, in confusion matrix memory 45, the possibility of confusing D for a P is eliminated from further consideration (step 860). The value of N is incremented once again (step 865), and an associative weighting is calculated for option identifier APX (step 870). Since APX was derived from option identifier ADX, the calculation would multiply together the probability that an A would be recognized as an A, the probability that a P would be misrecognized as a D, and the probability that an X would be recognized as an X. This calculation would yield a value of (0.70)(0.34)(0.65)=0.1547. If N does not yet equal MAX, the above-described procedure is repeated once again. This time, the identifiers ABX, ADX, and APX would be used as roots for generating the next option identifier.

Once MAX option identifiers have been generated, CPU 40 reduces the set of option identifiers to a set of candidate identifiers by using one of the procedures discussed above (step 880). That is, for example, CPU 40 may eliminate those option identifiers that are not matched with reference identifiers in memory 35 and subsequently select from this reduced set only those option identifiers associated with associative weightings that are greater than a predetermined threshold. After forming this candidate set of identifiers, CPU 40 may rank the members of this set from highest to lowest in terms of their respective associative weightings and then prompt the user with each of these ranked identifiers until either the user positively confirms one of these candidate identifiers as matching the input identifier or the user has been prompted with all the candidate identifiers, in which case CPU 40 would issue through voice prompt device 25 an error message (steps 885–900). If a positive match is confirmed by the user, then CPU 40 performs some sort of transaction on the basis of the confirmed candidate identifier.

By generating in the form of candidate identifiers a list of possible matches for an input identifier before consulting the array of stored reference identifiers, the various embodiments discussed herein are able to match an input identifier to a reference identifier more rapidly than if a probabilistic determination had to be made for each reference identifier. Furthermore, by avoiding having to perform a separate calculation for each reference identifier, the totality of which may comprise millions of separate identifiers, the present invention devotes a much smaller portion of available computing power to finding a match for an input identifier. As a result, the present invention allows processing resources that would otherwise be devoted to finding such a match to be used in other applications. The consequence of the present invention is thus a more efficient allocation of available resources among a host of various computing applications.

The above described embodiments are illustrative of the principles of the present invention. Other embodiments could be devised by those skilled in the art without departing from the spirit and scope of the present invention.

What is claimed is:

1. A method of recognizing an identifier entered by a user, the identifier including a first plurality of predetermined characters, the method comprising the steps of:

a) providing a recognized identifier based on the entered identifier, the recognized identifier comprising a second plurality of predetermined characters;

b) providing a plurality of reference identifiers, each one of the plurality of reference identifiers comprising a different plurality of predetermined characters;

c) generating a new plurality of identifiers and arranging the new identifiers as a set of option identifiers, each option identifier comprising a different plurality of characters determined on the basis of the recognized identifier and on a plurality of confusion sets and determined independently of the plurality of reference identifiers, each confusion set comprising a different character collection, wherein the recognized identifier is included in the set of option identifiers;

d) reducing the set of option identifiers to a set of candidate identifiers on the basis of the reference identifiers; and e) selecting one candidate identifier as matching the input identifier.

2. The method according to claim 1, wherein the step (c) comprises:

(i) obtaining at least one character from at least one current character position of the recognized identifier;

(ii) determining a confusion set to which each obtained character belongs;

(iii) replacing each obtained character in the current character position of the recognized identifier and of any previously created option identifier with at least one character of the associated confusion set determined in step (ii), each replacement operation creating a new option identifier;

(iv) obtaining a character from a next character position of the recognized identifier and any previously created option identifier; and (v) repeating steps (ii)–(iv) until a predetermined number of option identifiers have been created.

3. The method according to claim 1, wherein the step (d) comprises eliminating from the set of option identifiers those option identifiers not found in the plurality of reference identifiers, the remaining option identifiers comprising the set of candidate identifiers.

4. The method according to claim 1, wherein the step (e) comprises:

(i) prompting the user with each candidate identifier until the user confirms that a prompted candidate identifier matches the input identifier; and (ii) ceasing, if the user has not confirmed any prompted candidate identifier, the prompting in step (i) when the user is prompted with all the candidate identifiers.

5. A method of recognizing an identifier entered by a user, the identifier including a first plurality of predetermined characters, the method comprising the steps of:

a) providing a recognized identifier based on the entered identifier, the recognized identifier comprising a second plurality of predetermined characters;

b) determining an associative weighting for the recognized identifier;

c) providing a plurality of reference identifiers, each one of the plurality of reference identifiers comprising a different plurality of predetermined characters;

d) generating a set of option identifiers, each option identifier comprising a different plurality of characters determined on the basis of the recognized identifier and on a plurality of confusion sets, each confusion set comprising a different character collection, wherein the recognized identifier is included in the set of option identifiers;

e) determining an associative weighting for at least some of the option identifiers;

f) reducing the set of option identifiers to a set of candidate identifiers on the basis of the reference identifiers; and g) selecting one candidate identifier as matching the input identifier on the basis of the associative weighting of the selected candidate identifier.

6. The method according to claim 5, wherein the step (d) comprises:

(i) obtaining at least one character from at least one current character position of the recognized identifier;

(ii) determining a confusion set to which each obtained character belongs;

(iii) replacing each obtained character in the current character position of the recognized identifier and of any previously created option identifier with at least one character of the associated confusion set determined in step (ii), each replacement operation creating a new option identifier;

(iv) obtaining a character from a next character position of the recognized identifier and any previously created option identifier; and (v) repeating steps (ii)–(iv) until a predetermined number of option identifiers have been created.

7. The method according to claim 5, wherein each confusion set is associated with a character identity weighting and a character change weighting, each character identity weighting of each confusion set representing a probability of recognizing each character within an associated confusion set as itself, and each character change weighting representing a probability of recognizing one character within an associated confusion set as another character within the same confusion set.

8. The method according to claim 7, wherein the step b) comprises assigning each character of the recognized identifier a character identity weighting, the associative weighting of the recognized identifier being a function of the character identity weightings of the characters comprising the recognized identifier.

9. The method according to claim 8, wherein the associative weighting of the recognized identifier is a product of the character identity weightings of the characters comprising the recognized identifier.

10. The method according to claim 7, wherein each of the character change weightings and character identity weightings of each confusion set is derived from a confusion matrix.

11. The method according to claim 7, wherein for each option identifier other than the recognized identifier, the step e) comprises:

(i) obtaining a first generated option identifier;

(ii) eliminating a current generated option identifier other than the recognized identifier if any character of the current option identifier is not from the same confusion set as a character in a corresponding character position of the recognized identifier;

(iii) assigning, if each character of the current option identifier is from the same confusion set as the character in the corresponding character position of the recognized identifier, to each character of the current option identifier one of the character change weighting and the character identity weighting of the corresponding confusion set to which each character of the option identifier belongs;

(iv) determining the associative weighting for the current option identifier as a function of the character weightings determined in step (iii);

(v) repeating steps (ii)–(iv) for each generated option identifier other than the recognized identifier.

12. The method according to claim 11, wherein the step (iv) comprises:

(vi) multiplying together the assigned character weightings of step (iii).

13. The method according to claim 12, wherein the step (f) comprises eliminating from the set of option identifiers those option identifiers not found in the plurality of reference identifiers, the remaining option identifiers comprising the set of candidate identifiers.

14. The method according to claim 13, wherein the step (g) comprises selecting the candidate identifier associated with the highest associative weighting.

15. The method according to claim 5, wherein:

the set of option identifiers is generated as a new plurality of identifiers that is independent of the plurality of reference identifiers.

16. The method according to claim 5, wherein:

each one of the associative weighting for the recognized identifier and the associative weightings for the at least some of the option identifiers is a probabilistic value.

17. A method of recognizing an identifier entered by a user, the identifier including a first plurality of predetermined characters, the method comprising the steps of:

a) providing a recognized identifier based on the entered identifier, the recognized identifier comprising a second plurality of predetermined characters;

b) determining an associative weighting for the recognized identifier;

c) providing a plurality of reference identifiers, each one of the plurality of reference identifiers comprising a different plurality of predetermined characters;

d) generating a set of option identifiers, each option identifier comprising a different plurality of characters determined on the basis of the recognized identifier and on an arrangement of probabilistic values, each probabilistic value representing a probability of recognizing an associated character as itself or as another character, wherein the recognized identifier is included in the set of option identifiers;

e) determining an associative weighting for each one of the option identifiers;

f) reducing the set of option identifiers to a set of candidate identifiers on the basis of the reference identifiers; and g) selecting one candidate identifier as matching the input identifier on the basis of the associative weighting of the selected candidate identifier.

18. The method according to claim 17, wherein the step b) comprises:

(i) obtaining a character weighting for each character of the recognized identifier, each character weighting of each character of the recognized identifier representing a probability of recognizing the associated character of the recognized identifier as itself, each character weighting in step (i) being obtained from the arrangement of probabilistic values;

(ii) ignoring each probabilistic value used as a character weighting in step (i) after step (i) is performed; and (iii) determining the associative weighting of the recognized identifier as a function of the character weightings of each character of the recognized identifier determined in step (i).

19. The method according to claim 18, wherein the step (d) comprises:

(iv) obtaining a character from a current character position of each previously generated option identifier;

(v) determining for the current character position of each previously generated option identifier a character that is most likely confused with the character currently occupying the current character position of each previously generated option identifier, the determination of step (v) being determined on the basis of the arrangement of probabilistic values still under consideration;

(vi) repeating step (v) for each character position of each previously generated option identifier;

(vii) selecting from among the character confusions determined in steps (v)–(vi) the character confusion associated with the highest probabilistic value of the arrangement of probabilistic values still under consideration;

(viii) eliminating from further consideration the probabilistic value associated with the character confusion selected in step (vii);

(ix) creating a new option identifier on the basis of the character confusion selected in step (vii); and (x) repeating steps (iv)–(ix) until a predetermined number of option identifiers have been created.

20. The method according to claim 19, wherein the arrangement of probabilistic values comprises at least one confusion matrix.

21. The method according to claim 19, wherein the associative weighting of each option identifier is determined as a function of at least a portion of values maintained in the arrangement of probabilistic values.

22. The method according to claim 17, wherein the step (f) comprises eliminating from the set of option identifiers those option identifiers not found in the plurality of reference identifiers, the remaining option identifiers comprising the set of candidate identifiers.

23. The method according to claim 17, wherein the step (g) comprises selecting the candidate identifier associated with the highest associative weighting.

24. The method according to claim 17, wherein:
the set of option identifiers is generated as a new plurality of identifiers that is independent of the plurality of reference identifiers.

25. The method according to claim 17, wherein:
each one of the associative weighting for the recognized identifier and the associative weightings for the option identifiers is a probabilistic value.

26. The apparatus according to claim 17, wherein:
each one of the associative weighting for the recognized identifier and the associative weightings for the option identifiers is a probabilistic value.

27. An apparatus for recognizing an identifier entered by a user, the indentifier including a first plurality of predetermined characters, the apparatus comprising:

a) first means for providing a recognized identifier based on the entered identifier, the recognized identifier comprising a second plurality of predetermined characters;

b) second means for providing a plurality of reference identifiers, each one of the plurality of reference identifiers comprising a different plurality of predetermined characters;

c) means for generating a new plurality of identifiers and arranging the new identifiers as a set of option identifiers, each option identifier comprising a different plurality of characters determined on the basis of the recognized identifier and on a plurality of confusion sets and determined independently of the plurality of reference identifiers, each confusion set comprising a different character collection, wherein the recognized identifier is included in the set of option identifiers;

d) means for reducing the set of option identifiers to a set of cndidate identifiers on the basis of the reference identifiers; and e) first means for selecting one candidate identifier as matching the input identifier.

28. The apparatus according to claim 27, wherein the means for generating comprises:

(i) first means for obtaining at least one character from at least one current character position of the recognized identifier;

(ii) means for determining a confusion set to which each obtained character belongs;

(iii) means for replacing each obtained character in the current character position of the recognized identifier and of any previously created option identifier with at least one character of the associated confusion set determined by the means for determining, each replacement operation creating a new option identifier; and (iv) second means for obtaining a character from a next character position of the recognized identifier and any previously created option identifier.

29. The apparatus according to claim 27, wherein the means for eliminating comprises means for eliminating from the set of option identifiers those option identifiers not found in the plurality of reference identifiers, the remaining option identifiers comprising the set of candidate identifiers.

30. The apparatus according to claim 27, wherein the means for selecting comprises:

(i) means for prompting the user with each candidate identifier until the user confirms that a prompted candidate identifier matches the input identifier; and (ii) means for ceasing the means for prompting when the user is prompted with all the candidate identifiers.

31. An apparatus for recognizing an identifier entered by a user, the identifier including a first plurality of predetermined characters, the apparatus comprising:

a) first means for providing a recognized identifier based on the entered identifier, the recognized identifier comprising a second plurality of predetermined characters;

b) first means for determining an associative weighting for the recognized identifier;

c) second means for providing a plurality of reference identifiers, each one of the plurality of reference identifiers comprising a different plurality of predetermined characters;

d) means for generating a set of option identifiers, each option identifier comprising a different plurality of characters determined on the basis of the recognized identifier and on a plurality of confusion sets, each confusion set comprising a different character collection, wherein the recognized identifier is included in the set of option identifiers;

e) second means for determining an associative weighting for at least some of the option identifiers;

f) means for reducing the set of option identifiers to a set of candidate identifiers on the basis of the reference identifiers; and g) means for selecting one candidate identifier as matching the input identifier on the basis of the associative weighting of the selected candidate identifier.

32. The apparatus according to claim 31, wherein the means for generating comprises:

(i) first means for obtaining at least one character from at least one current character position of the recognized identifier;

(ii) third means for determining a confusion set to which each obtained character belongs;

(iii) means for replacing each obtained character in the current character position of the recognized identifier and of any previously created option identifier with at least one character of the associated confusion set determined by the third means for determining, each replacement operation creating a new option identifier; and (iv) second means for obtaining a character from a next character position of the recognized identifier and any previously created option identifier.

33. The apparatus according to claim 31, wherein each confusion set is associated with a character identity weighting and a character change weighting, each character identity weighting of each confusion set representing a probability of recognizing any character within an associated confusion set as itself, and each character change weighting representing a probability of recognizing any character within an associated confusion set as another character within the same confusion set.

34. The apparatus according to claim 33, wherein the first means for determining comprises:

(i) first means for obtaining a character identity weighting for each character of the recognized identifier, each character identity weighting of each character of the recognized identifier representing a probability of recognizing the associated character of the recognized identifier as itself; and (ii) third means for determining the associative weighting of the recognized identifier as a function of the character identity weighting of each character of the recognized identifier determined by the first means for obtaining.

35. The apparatus according to claim 34, wherein the third means for determining comprises means for multiplying together each of the character identity weightings of each character of the recognized identifier.

36. The apparatus according to claim 33, wherein each character identity weighting and each character change weighting is derived from a confusion matrix.

37. The apparatus according to claim 33, wherein for each option identifier other than the recognized identifier, the second means for determining comprises:

(iii) first means for eliminating any option identifier other than the recognized identifier if any character in the option identifier is not from the same confusion set as a character in a corresponding character position of the recognized identifier;

(iv) fourth means for determining the confusion set to which each character of any remaining option identifier belongs;

(v) second means for obtaining for each character of each remaining option identifier one of the character identity weighting and the character change weighting associated with each confusion set determined by the fourth means for determining; and (vi) fifth means for determining the associative weighting for any remaining option identifier as a function of the character weightings determined by the second means for obtaining.

38. The apparatus according to claim 37, wherein the fifth means for determining comprises:

(vi) means for assigning to each character position of each remaining option identifier one of the character identity weighting and character change weighting determined by the second means for obtaining; and (vii) means for multiplying together the assigned character weightings assigned by the means for assigning.

39. The apparatus according to claim 38, wherein the means for reducing comprises second means for eliminating from the set of option identifiers those option identifiers not found in the plurality of reference identifiers, the remaining option identifiers comprising the set of candidate identifiers.

40. The apparatus according to claim 39, wherein the means for selecting selects the candidate identifier associated with the highest associative weighting.

41. The apparatus according to claim 31, wherein:

the set of option identifiers is generated as a new plurality of identifiers that is independent of the plurality of reference identifiers.

42. The apparatus according to claim 31, wherein:

each one of the associative weighting for the recognized identifier and the associative weightings for the at least some of the option identifiers is a probabilistic value.

43. An apparatus for recognizing an identifier entered by a user, the identifier including a first plurality of predetermined characters, the apparatus comprising:

a) first means for providing a recognized identifier based on the entered identifier, the recognized identifier comprising a second plurality of predetermined characters;

b) first means for determining an associative weighting for the recognized identifier;

c) second means for providing a plurality of reference identifiers, each one of the plurality of reference identifiers comprising a different plurality of predetermined characters;

d) first means for generating a set of option identifiers, each option identifier comprising a different plurality of characters determined on the basis of the recognized identifier and on an arrangement of probabilistic values, each probabilistic value representing a probability of recognizing an associated character as one of itself and another character, wherein the recognized identifier is included in the set of option identifiers;

e) second means for determining an associative weighting for each one of the option identifiers;

f) means for reducing the set of option identifiers to a set of candidate identifiers on the basis of the reference identifiers; and g) first means for selecting one candidate identifier as matching the input identifier on the basis of the associative weighting of the selected candidate identifier.

44. The apparatus according to claim 43, wherein the first means for determining comprises:

(i) first means for obtaining a character weighting for each character of the recognized identifier, each character weighting of each character of the recognized identifier representing a probability of recognizing the associated character of the recognized identifier as itself, each character weighting being obtained from the arrangement of probabilistic values;

(ii) first means for eliminating from further consideration each probabilistic value used as a character weighting by the means for obtaining; and (iii) third means for determining the associative weighting of the recognized identifier as a function of the character weightings of each character of the recognized identifier obtained by the first means for obtaining.

45. The apparatus according to claim 44, wherein the first means for generating comprises:

(iv) second means for obtaining a character from a current character position of each previously generated option identifier;

(v) fourth means for determining for the current character position of each previously generated option identifier a character that is most likely confused with the character currently occupying the current character position of each previously generated option identifier, the determination performed by the fourth means for determining being accomplished on the basis of the arrangement of probabilistic values still under consideration;

(vi) second means for selecting from among the character confusions determined by the fourth means for determining the character confusion associated with the highest probabilistic value of the arrangement of probabilistic values still under consideration;

(vii) second means for eliminating from further consideration the probabilistic value associated with the character confusion selected by the second means for selecting; and (ix) means for creating a new option identifier on the basis of the character confusion selected by the second means for selecting.

46. The apparatus according to claim 45, wherein the arrangement of probabilistic values comprises at least one confusion matrix.

47. The apparatus according to claim 46, wherein the associative weighting of each option identifier is determined as a function of at least a portion of values maintained in the arrangement of probabilistic values.

48. The apparatus according to claim 43, wherein the means for reducing comprises means for eliminating from the set of option identifiers those option identifiers not found in the plurality of reference identifiers, the remaining option identifiers comprising the set of candidate identifiers.

49. The apparatus according to claim 43, wherein the first means for selecting selects the candidate identifier associated with the highest associative weighting.

50. The apparatus according to claim 43, wherein:

the set of option identifiers is generated as a new plurality of identifiers that is independent of the plurality of reference identifiers.

\* \* \* \* \*